(12) United States Patent
Chen

(10) Patent No.: US 11,049,195 B2
(45) Date of Patent: Jun. 29, 2021

(54) MODELING ANALYSIS METHOD BASED ON GEOGRAPHIC TARGETS

(71) Applicant: Longyu Chen, Shaanxi (CN)

(72) Inventor: Longyu Chen, Shaanxi (CN)

( * ) Notice: Subject to any disclaimer, the term of this patent is extended or adjusted under 35 U.S.C. 154(b) by 0 days.

(21) Appl. No.: 16/885,240

(22) Filed: May 27, 2020

(65) Prior Publication Data

US 2020/0311836 A1    Oct. 1, 2020

Related U.S. Application Data

(63) Continuation of application No. PCT/CN2018/125393, filed on Dec. 29, 2018.

(30) Foreign Application Priority Data

Feb. 9, 2018  (CN) .......................... 201810131136.4

(51) Int. Cl.
*G06Q 50/06* (2012.01)
*G06F 16/29* (2019.01)
(Continued)

(52) U.S. Cl.
CPC ............. *G06Q 50/06* (2013.01); *G06F 16/29* (2019.01); *G09B 29/007* (2013.01); *H04L 51/04* (2013.01); *H04L 51/20* (2013.01)

(58) Field of Classification Search
CPC ...... G06Q 50/06; G06F 16/29; G09B 29/007; H04L 51/04; H04L 51/20; H04L 41/145;
(Continued)

(56) References Cited

U.S. PATENT DOCUMENTS

| 8,249,605 B2 * | 8/2012 | Niranjan | H04L 12/66 455/446 |
| 2016/0156513 A1 * | 6/2016 | Zhang | H04L 67/10 709/220 |

(Continued)

FOREIGN PATENT DOCUMENTS

| CN | 101944204 A | 1/2011 |
| CN | 103425745 A | 12/2013 |

(Continued)

OTHER PUBLICATIONS

International Search Report of PCT Patent Application No. PCT/CN2018/125393 dated Mar. 14, 2019.

*Primary Examiner* — Michael A Keller
(74) *Attorney, Agent, or Firm* — Westbridge IP LLC

(57) ABSTRACT

The present application relates to a modeling analysis method based on geographic targets. According to the method, data acquisition is carried out on the basis of a mobile client, and rapid modeling is carried out on the basis of a predetermined rule, so that the workload of maintenance and analysis of data in an existing network management system is reduced, and the network management efficiency is improved. The technical proposal employed in the present application is: a modeling analysis method based on geographic targets, which includes: using predetermined targets at related geographic positions as nodes of a network model; acquiring position information of the nodes by means of the mobile client and carrying out classification; and establishing a connection relationship between the nodes representing the geographic positions and the network model according to an established rule.

6 Claims, 14 Drawing Sheets

(51) Int. Cl.
  *G09B 29/00* (2006.01)
  *H04L 12/58* (2006.01)
(58) Field of Classification Search
  CPC ......... H04L 41/22; H04L 41/12; H04L 41/14; H04L 43/045
  See application file for complete search history.

(56) References Cited

U.S. PATENT DOCUMENTS

2016/0343093 A1\* 11/2016 Riland ................... G06Q 10/04
2018/0338001 A1\* 11/2018 Pereira Cabral ........ H04L 12/14
2018/0359651 A1\* 12/2018 Mota ..................... H04W 24/08

FOREIGN PATENT DOCUMENTS

| | | |
|---|---|---|
| CN | 104317821 A | 1/2015 |
| CN | 104361586 A | 2/2015 |
| CN | 104596533 A | 5/2015 |

\* cited by examiner

MODELING ANALYSIS METHOD BASED ON GEOGRAPHIC TARGETS

CROSS REFERENCE TO RELATED APPLICATIONS

This application is a continuation application of PCT/CN2018/125393, filed on Dec. 29, 2018, which claims priority of Chinese Patent Application No. 201810131136.4 filed on Feb. 9, 2018. The contents of the applications are incorporated herein by reference in their entireties.

TECHNICAL FIELD

This application relates to information technology and is a modeling and analysis method based on electronic map application. It can be used for the development of big data modeling and analysis tools.

BACKGROUND

Due to the nature of monopolies in the municipal industry such as water, electricity and heating, most companies in the municipal industry claim that the operation and management of the pipeline network can only be displayed on the company intranet considering network security. Therefore, the electronic map which shows the distribution range of the pipeline network can only be purchased from the department of surveying and mapping on a regular basis, resulting in that the update of the electronic map lagging behind the requirements of urban development. Moreover, in order to accurately display the position information of the device on the electronic map, the acquired device position information must be acquired from the site using GPS, and then entered into the electronic map of the intranet, this results in inconvenience in the operation and maintenance of the network device. It has become a trend to use big data analysis tools to manage daily social affairs with the development of society. With the establishment of the management network, a large amount of field data entry and maintenance work has arisen. Currently, the acquisition of geographic-position-related data mostly relies on on-site positioning by staff using handheld GPS, and then the acquired data is manually imported into a geographic information system. For the geographic information system, the imported data represents only the acquired coordinates, not the type of the target. When the data is entered into the system for application, data reprocessing is required, which not only classifies the data, but also connects the topological relation between the data. This not only results in low efficiency and is more prone to errors in data classification and connection relationships, but also is unable to respond to the changing requirements of the network operating state in time, causing great difficulties to the application of the target management system. This traditional management method is no longer suitable for the future development needs of big data analysis and management. How to quickly and efficiently complete the processing of massive data sources has become a major problem in current big data management network systems (FIG. 1: modeling method of the prior art).

In order to improve the accuracy of data modeling, Intergraph Corporation in the United States of America has proposed a rule-driven device management solution years ago. ESRI also developed application modules for related products. However, they did not demonstrate an in-depth combination with the data collection via mobile clients based on current Internet applications.

Nowadays, based on the emergence of various types of Internet applications, domestic scholars have proposed some new methods for the modeling and analysis of various types of data, mainly including: in the patent application "Method for Checking Power Failure Information Using Image Technology" (Publication No. CN 104317821 A) by State Grid Corporation of China, a user can bind his/her meter number in the WeChat and then send the geographic position to obtain a text content about the information of power outage in the surrounding area. Nonetheless, this method cannot dynamically respond to changes in the operating state of the power grid. The source of the outage data has to depend on the power grid company, which makes the rapid response of information difficult. In the patent application "Mobile Modeling Acquisition System" (Publication No. CN 103425745 A) by GUANGZHOU O CN NETWORK TECHNOLOGY CO. LTD., the acquired pictures are bound with information, achieving an intuitive display of object information. However, it greatly differs from the present application of analyzing the acquired targets as a network node in that the former does not involve dynamic operation analysis of the network. In the patent application "Automatic Guided Vehicle Based on Map Matching and Guide Method of Automatic Guided Vehicle" (Publication No. CN 104596533 A) by Shanghai Jiaotong University, the automatic guided vehicle matches the local environment information currently observed with the global map established in advance by means of its built-in positioning module, and plans a feasible optimal path in the global map using a path planning module. It focuses on the related application of geographic information in the map, and it is different from the method of considering the target as a component of the network and focusing on network analysis in the present application. The commonality of the above-mentioned methods is that they all focus on the use of geographic position information, and they rely more on electronic maps. This application uses the electronic map only as a background reference. With the formation of the network, the geographic target is considered as a component of the network, and more attention is paid to the impact of the operation analysis of the network dynamic change on the related geographic target nodes. So far, no report has been found on the direct application of this technology to network modeling and analysis.

SUMMARY

An objective of the present application is to provide a modeling analysis method based on geographic targets, in which data acquisition is carried out on the basis of a mobile client, and rapid analysis is carried out on the basis of a predetermined rule, so that the workload of maintenance and analysis of data in an existing network management system is reduced. This facilitates the management and analysis of geographic data by means of big data.

To achieve the above objective, a technical proposal of the present application is that, a modeling analysis method based on geographic targets, which includes:

Using predetermined targets at related geographic positions as nodes of a network model; acquiring position information of the nodes by means of the mobile client and carrying out classification; and establishing a connection relationship between the nodes representing the geographic positions and the network model according to an established rule. Geographic targets refer to objects that can be managed through the network, such as switches, transformers, telecommunications base station equipment, water pipe valves and various users in the power grid.

The modeling method includes the following steps:

1) Defining network connection rules by using geographically predetermined targets as nodes of a network model;

2) Acquiring position information of the nodes by means of a mobile client and carrying out classification;

3) Receiving the information from the mobile client, and displaying the geographic positions of the targets on an electronic map;

4) Establishing a connection relationship between the nodes representing the geographic positions and the network model according to an established rule.

The modeling method specifically includes the following steps:

1) Defining a node connection rule and establishing the target network model;

2) Developing a target network software based on an electronic map application;

3) Acquiring position information of the target through a wireless terminal application;

4) Receiving information of target nodes based on the electronic map background;

5) Searching surrounding network nodes based on the position information of the nodes;

6) Making network node connections according to the predetermined connection rule.

The network model includes a simulation network software that can simulate the network operation rules and can perform topology analysis.

The position information of the nodes is acquired via a mobile client. The mobile client includes GPS devices, mobile phones, Apple touch, street view shooting vehicles, and mobile devices with a wireless positioning and acquisition function whose positioning methods include: mobile base station positioning, Wi-Fi positioning and GPS positioning.

The position information of the nodes is acquired via the mobile client. Devices are usually used as nodes, and the position information of the devices is acquired by a mobile client with an instant messaging service, and displayed on the electronic map.

In the software model, by analyzing the types of nodes and the existing connection rule, the physical connection between the nodes is automatically completed, and a topological relation between the nodes is automatically established.

Application for network modeling of a power grid management system, including the following steps:

1) Making a list of devices and establishing a power grid model;

2) Analyzing device attributes and defining a connection rule;

3) Developing a mobile application and carrying out data acquisition;

4) Displaying device positions based on an electronic map;

5) Implementing physical networking in accordance with the connection rule;

6) Completing topological networking according to the state of a switch.

Application for a power outage management system for users, including the following steps:

1) Developing a network application based on an electronic map;

2) Marking position of a device and entering attribute data;

3) Establishing a topological connection according to device attributes;

4) Receiving inquiries from the users and marking positions of the users;

5) Associating power grid devices and analyzing range of the power outage;

6) Combining the causes of the power outage and informing related users.

The position information of the node is acquired via a mobile client. The position information of the device may be acquired through a mobile client with an instant messaging service function, such as WeChat, facebook, MSN and the like.

Compared with the prior art, the present application has the following advantages and effects:

1. According to distribution characteristics of the map targets relying on the geographical environment, the present application combines the network model based on the connection rule, the electronic map application based on space management, and the data positioning and acquiring technology based on mobile clients. Geographically predetermined targets are used as nodes of a network model, and the position information of the nodes is acquired by means of the mobile client, so that a connection is established between the nodes representing the geographic positions and the network model according to a predetermined rule, thereby completing the network establishment efficiently (FIG. 2: a schematic diagram of a modeling method of the present application).

2. Compared with the existing methods, by applying the method of the present application, the data acquisition of predetermined targets around a road may be completed through the mobile terminal when moving along the road, and the establishment and analysis of the network model of the target management system based on the electronic map may be completed rapidly. This method greatly improves the efficiency of data entry, which promotes the maintenance and analysis efficiency of massive data based on geographic information.

3. Since the electronic map is mainly used as the display background of the target management network, it does not affect the topology of the network. Therefore, it is not necessary to use a special measuring tool for high-precision on-site positioning. The position information obtained through the positioning technology of the mobile terminal can fully meet the requirements of management and display, reducing the investment of special measuring tools and training time, thereby saving significant human and financial resources.

4. For the target management network, virtually displaying the geographic position of the targets on the electronic map according to the geographical distribution of the targets is beneficial to the macro management of the targets. According to the change of the state of the targets, the topological connection between targets is directly affected and the efficiency of network operation and analysis is improved. The combination of the two will help enhance the management of the target network based on geographic information.

5. The construction of the urban pipeline network requires the approval of the planning department. The government has first-hand detailed information, so it can entrust a third party to set up a device management network in a monopoly industry. At the same time, acquisition of information of a user's device which newly joins the network can be carried out simultaneously with the construction of the network. With the improvement of the network, the analysis results of the network operating state may come from the feedback of users, and it may not necessarily rely on the information provided by the monopoly industries such as electricity and water supply. This is helpful for the government to obtain the operating state of the municipal network as soon as possible, and improve the quality of public services and emergency response efficiency.

Therefore, in the target management network based on geographic information, the predetermined targets are used as nodes in the network, and the classification of different targets is achieved by means of the positioning of the mobile client. On the electronic map, the connections between the targets and the network are automatically completed according to the predetermined connection rule. Accordingly, the establishment of the network may be quickly completed and efficient management of the targets may be achieved.

DESCRIPTION OF THE EMBODIMENTS

Figure 1:
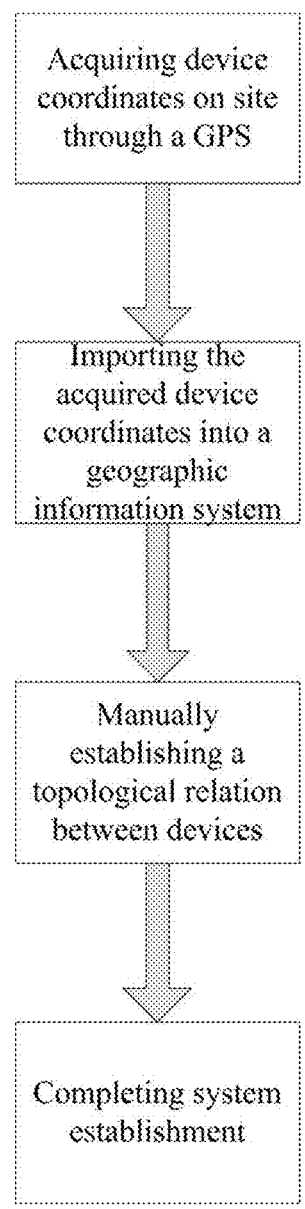
FIG. 1 is a schematic diagram of an existing modeling method.
Figure 2:
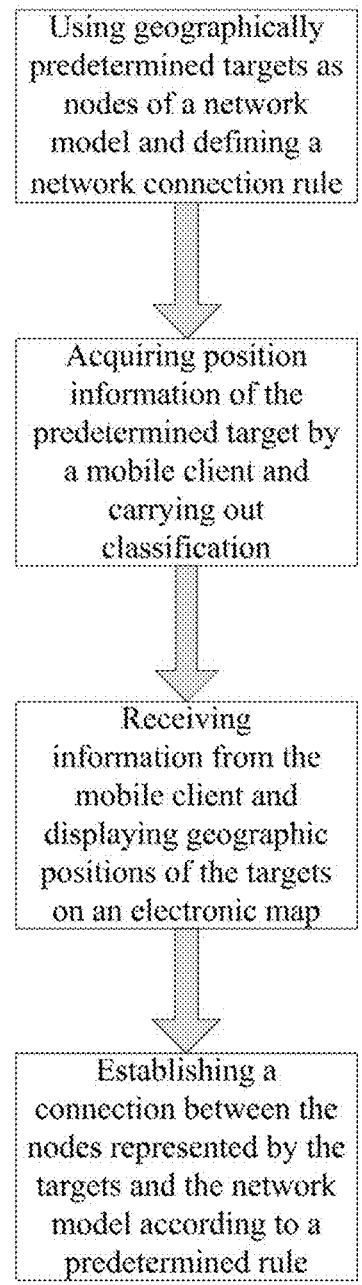
FIG. 2 is a schematic diagram of a modeling method of the present application.
Figure 3:
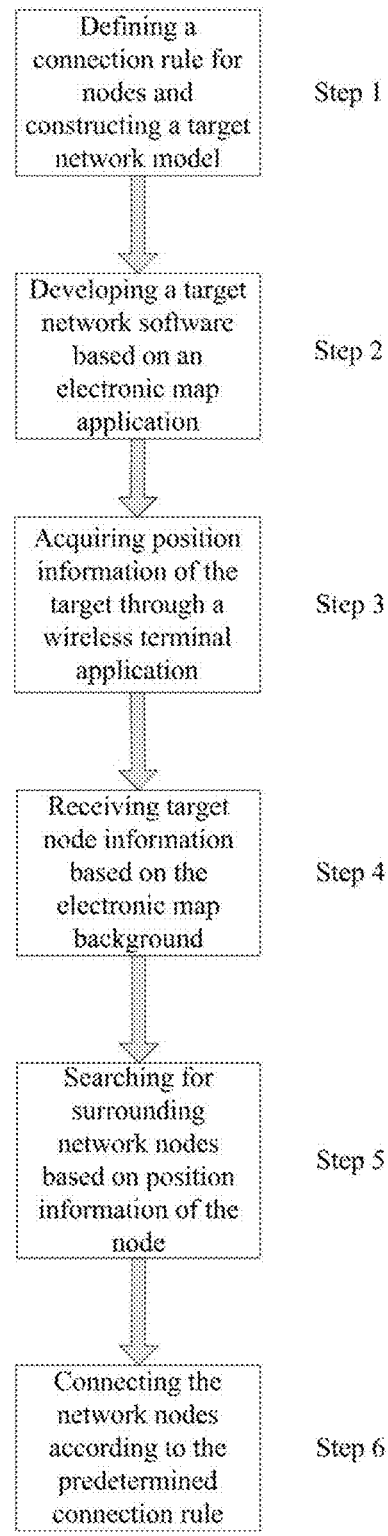
FIG. 3 is a schematic diagram of implementation steps of the present application.

Referring to FIG. 3, FIG. 3 is a schematic diagram of implementation steps of the present application. The complete steps of the method of the present application are:

Step 1: defining a connection rule for nodes and constructing a target network model.
1) Content: using geographically predetermined targets as the nodes of the network model, defining a connection rule, and constructing network model.
2) Specific approach: a rule-driven device management modeling method similar to that of Intergraph Corporation is adopted. For the target management network to be established, first listing the types of targets involved in the network, and then defining the targets as nodes of the network, and defining a connection rule of the various types of nodes in the network, finally connecting the nodes with lines according to the rule to complete the construction of the target management network model.

Step 2: developing a target network software based on an electronic map application.
1) Content: developing a network target management system based on an electronic map and rule connections.
2) Specific approach: based on a rule-driven device management modeling method, developing a network software which uses an electronic map as the background and is based on cloud storage and cloud computing to prepare for the application of the network management model.

Step 3: acquiring position information of the targets through a wireless terminal application.
1) Content: developing data acquisition client based on position acquisition technology of a wireless terminal.
2) Specific approach: developing mobile client application based on wireless positioning acquisition technology to acquire geographic position information of target nodes.

Step 4: receiving target node information based on the electronic map background.
1) Content: receiving client information and displaying the position of the target node on the electronic map.
2) Specific approach: receiving target node information (including node position coordinates, node types, etc.) sent by the client in the cloud, and using the electronic map as the background to display the node information on the cloud electronic map.

Step 5: searching for surrounding network nodes based on the position information of the node.
1) Content: searching for information of other network nodes around the present node on the electronic map.
2) Specific approach: on the electronic map, taking the geographic position of the present node as a center and searching for nodes information of the adjacent network around the target according to the predetermined connection rule.

Step 6: connecting the network nodes according to the predetermined connection rule.
1) Content: connecting the present node to the searched network nodes according to the predetermined connection rule.
2) Specific approach: based on the position of the node and the type of the node displayed on the electronic map, connecting the present node and the adjacent nodes in the network according to the predetermined rule, so that the node joins the network to be a part of the network model.

Figure 4:
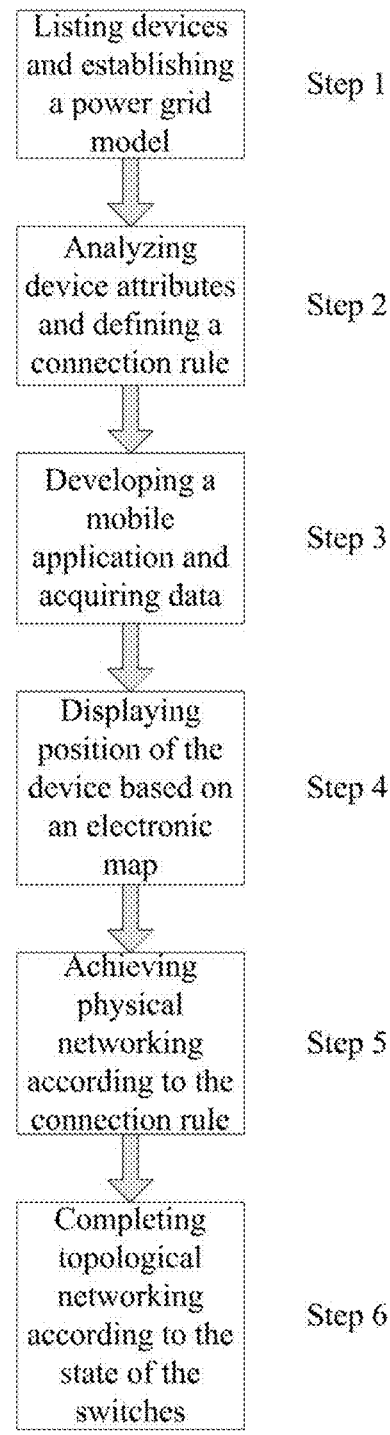
FIG. 4 is a schematic diagram of network modeling of a power grid management system.

Embodiments (I) Application for Network Modeling of a Power Grid Management System As an essential part of urban management, a good power grid management system is an important guarantee of the power supply. A power grid is an important medium for power companies to supply power to users. Through an efficient power grid management system, the power companies can provide users with high-quality and reliable power services. A complete power grid management system not only includes various types of power grid device, but also contains user information that changes constantly. How to rapidly complete the establishment of a power grid management system is an important embodiment of the present application. (FIG. 4: a schematic diagram of network modeling of a power grid management system)

Step 1:

1. Content: making a list of devices and establishing a power grid model.

2. Specific approach:

1) Making a list of devices involved in the power grid system, such as targets like substations, ring main units, public transformers, switches etc., and large, medium and small users and the like;

2) Developing rule-driven device management application. This software is big data cloud application using electronic maps as background. In the software, various types of devices and users are defined as network nodes, and the nodes are connected by lines to form a management network for power grid targets.

Step 2:

1. Content: analyzing device attributes and defining a connection rule.

Figure 5:
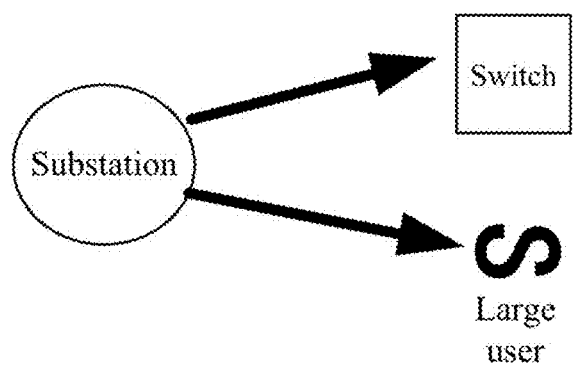
FIG. 5 is a schematic diagram of connection attributes of a substation.
Figure 6:
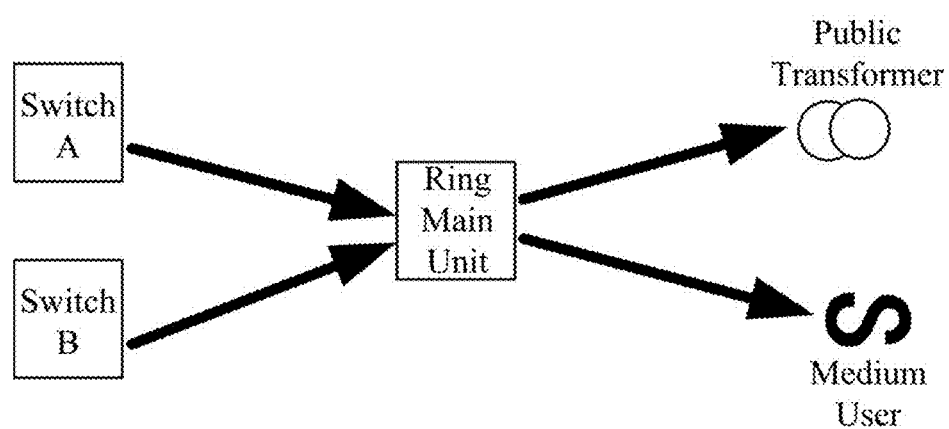
FIG. 6 is a schematic diagram of connection attributes of a ring main unit.
Figure 7:
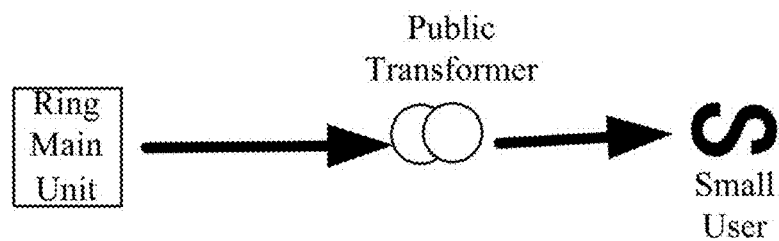
FIG. 7 is a schematic diagram of connection attributes of a public transformer.
Figure 8:
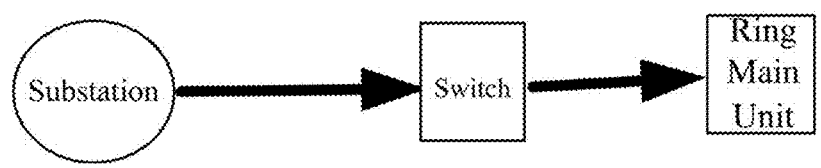
FIG. 8 is a schematic diagram of connection attributes of a switch.
Figure 9:
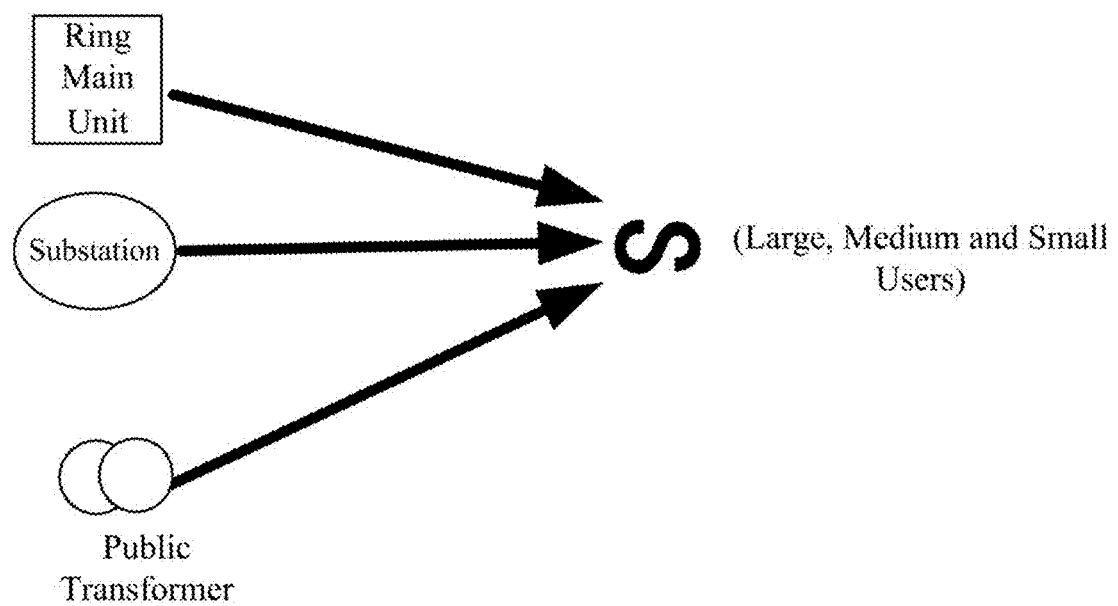
FIG. 9 is a schematic diagram of connection attributes of users.

2. Specific approach: during the development of the cloud software, the topological connection rule of different types of nodes in the network is defined in advance according to different states of the various devices when the power grid is in operation in the reality. For example, a substation as a power supply point can supply power to switches and large users (FIG. 5: a schematic diagram of the connection attributes of a substation); a ring main unit as a device in the line supplies power to medium users and public transformers, and its power can be supplied from different switches (FIG. 6: a schematic diagram of the connection attributes of the ring main unit); a public transformer as a device at the terminal of the line supplies power to small users such as residents, and its upper-level power supply is from the ring main unit (FIG. 7: a schematic diagram of connection attributes of a public transformer); a switch as a device in the line can be connected to the substation and the ring main unit. Whether the switch is open or closed directly affects the power supply area of the power supply in the line and plays a decisive role in the change of the topological connection relationship of the devices in the network (FIG. 8: a schematic diagram of switch connection attributes); similarly, according to the amount of electricity consumed by the electrical devices of the users, their power is supplied from the substation, the ring main unit and the public transformer respectively (FIG. 9: a schematic diagram of user connection attributes).

Step 3:

1. Content: developing a mobile application and acquiring data.

Figure 10:
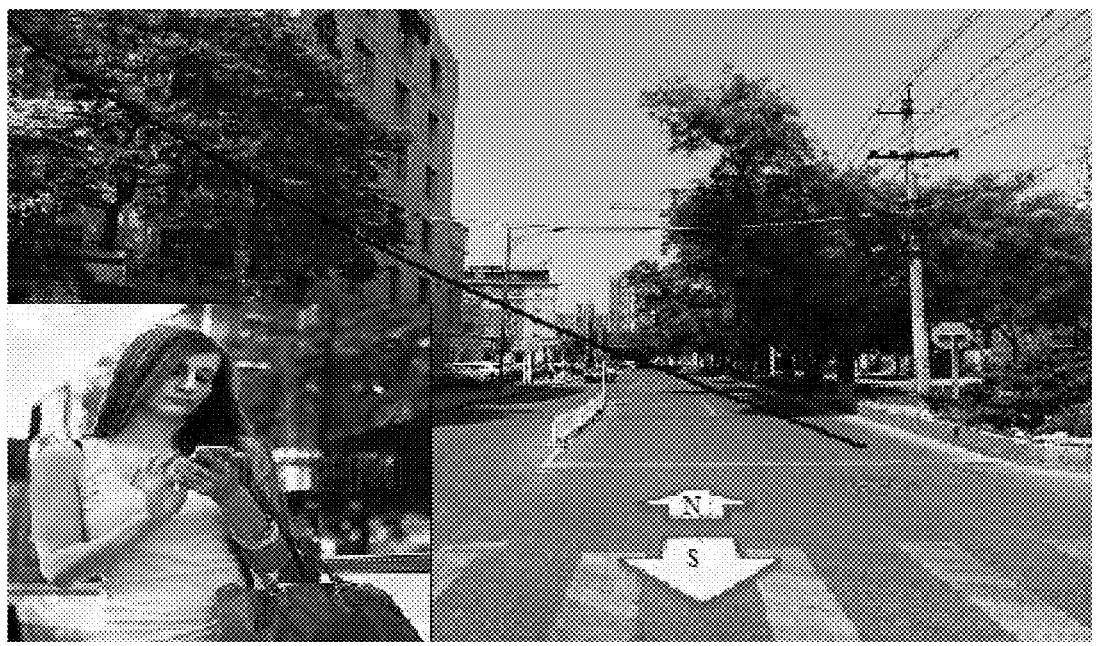
FIG. 10 is a schematic diagram of acquisition of device data based on WeChat application on a mobile phone.

2. Specific approach:

1) Developing a mobile client application based on data acquisition in order to facilitate the classification of the position information of the acquired devices;

2) Starting from the substation, acquiring the geographic position information of the substation, the ring main unit, the public transformer, the switch and various users along the path of the line, and sending the information through the clients (FIG. 10: a schematic diagram of acquisition of device data based on a mobile client application).

Step 4:

1. Content: displaying position of the device based on an electronic map.

Figure 11:
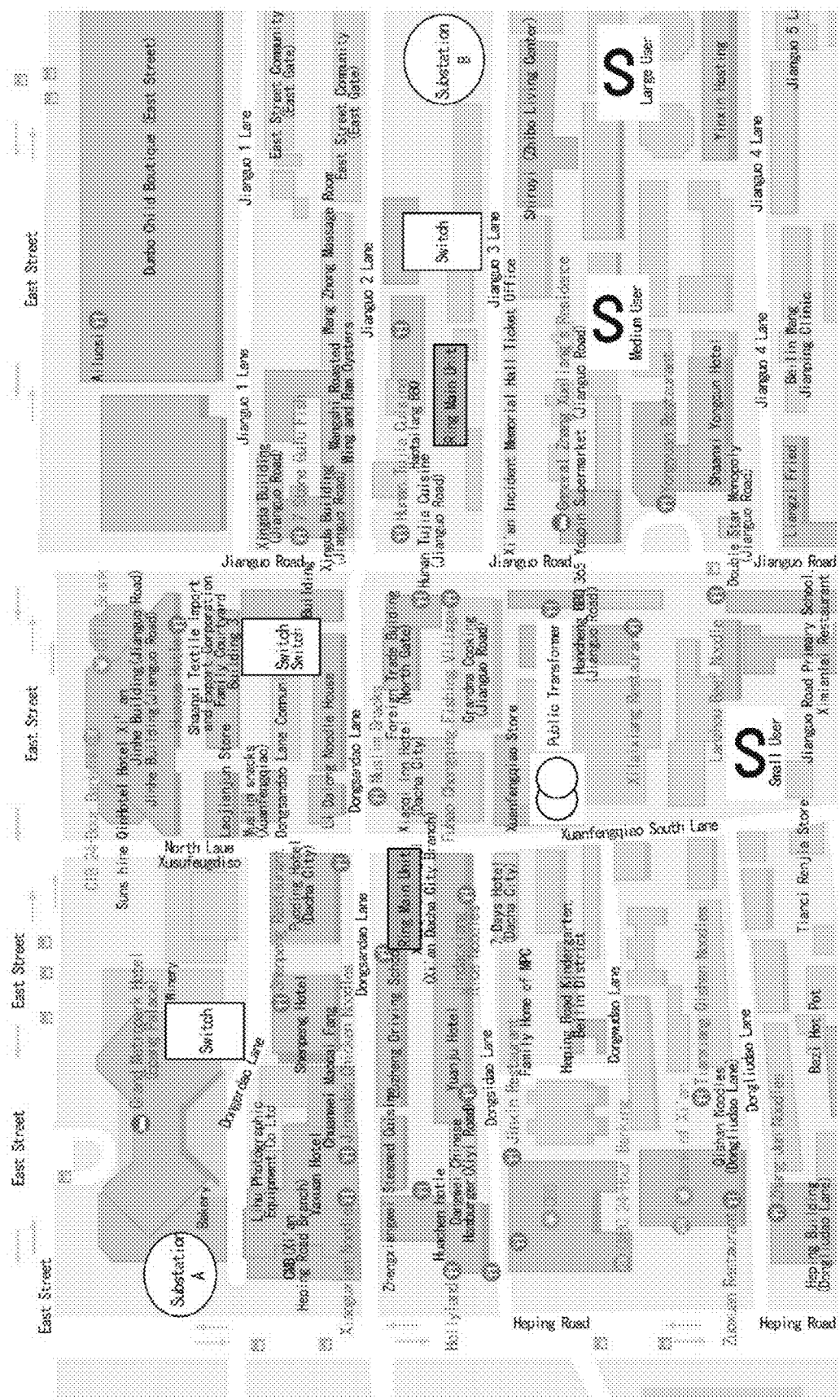
FIG. 11 is a schematic diagram of devices positions based on an electronic map.

2. Specific approach: receiving data sent by mobile clients in the cloud, according to the distribution of the power grid on the streets, considering users as devices in the power grid and displaying the position of different devices and various users in the power grid model on the electronic map, so that the information of devices in the grid and users can be displayed intuitively on the map (FIG. 11: a schematic diagram of device position based on an electronic map).

Step 5:

1. Content: achieving physical networking according to the connection rule.

Figure 12:
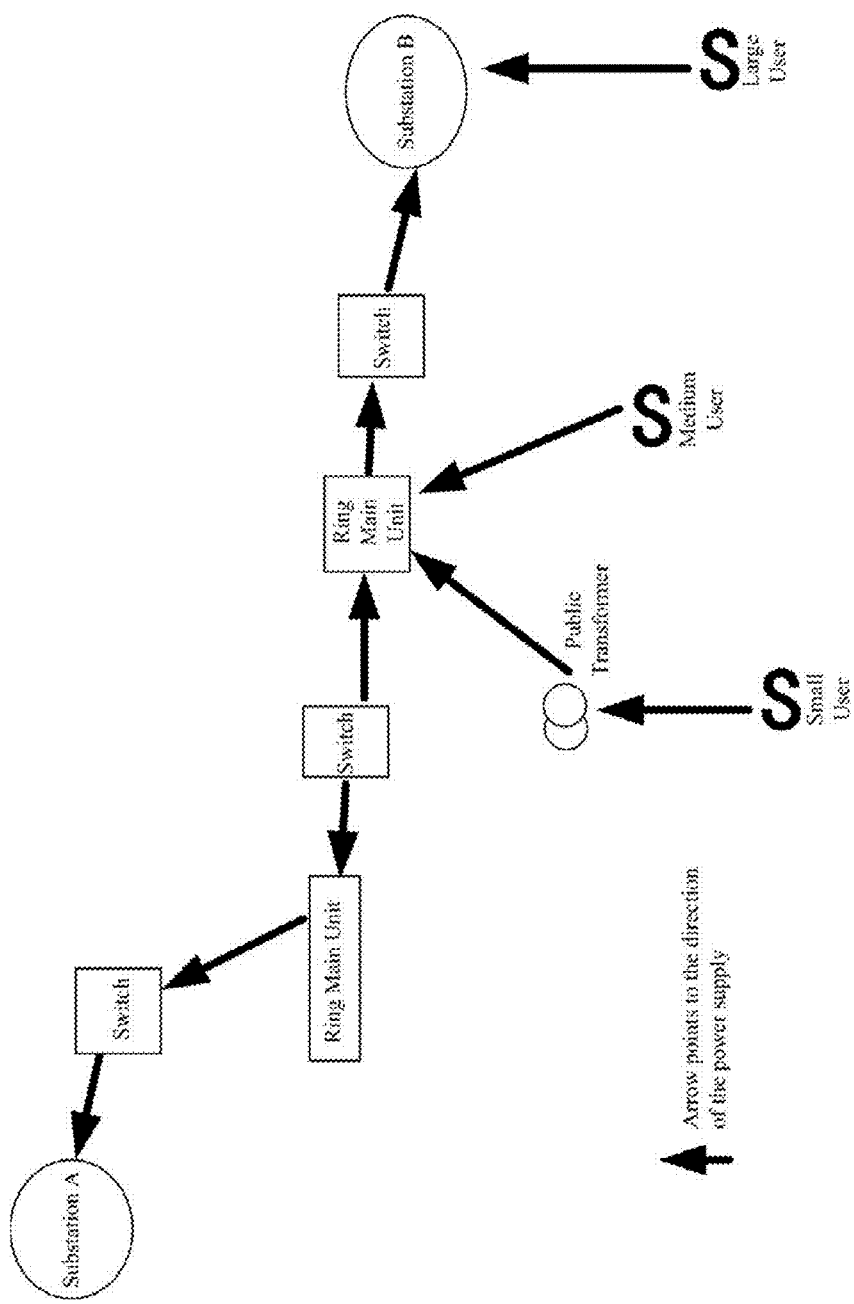
FIG. 12 is a schematic diagram of connection of devices based on rule networking.

2. Specific approach:

1) In the cloud software, searching information of surrounding devices according to the positions of different devices and various users displayed on the electronic map;

2) According to the different types of devices and the established connection rule, a physical connection between the geographic position of the device and the upper-level power supply point is made. That is: switches and large users can be connected to substations; public transformers and medium users can be connected to ring main units; small users such as residents can be connected to public transformers. The automatic connection of the devices mainly depends on the topological relation set by the rule, and is not related to the line connecting the devices (FIG. 12: a schematic diagram of connection of devices based on rule networking).

Step 6:

1. Content: completing topological networking according to the state of the switches.

2. Specific approach:

1) In the cloud software based on the electronic map, determining the topological relation between adjacent devices in the network according to the different operating states of on and off of the switches;

2) According to the types of different nodes such as substations, ring main units, public transformers, switches and large, medium and small users and the current direction of their power supply device, checking the network connection with the lower-level power supply device to ensure the correct topological relation so as to complete the establishment of the entire network system.

Figure 13:
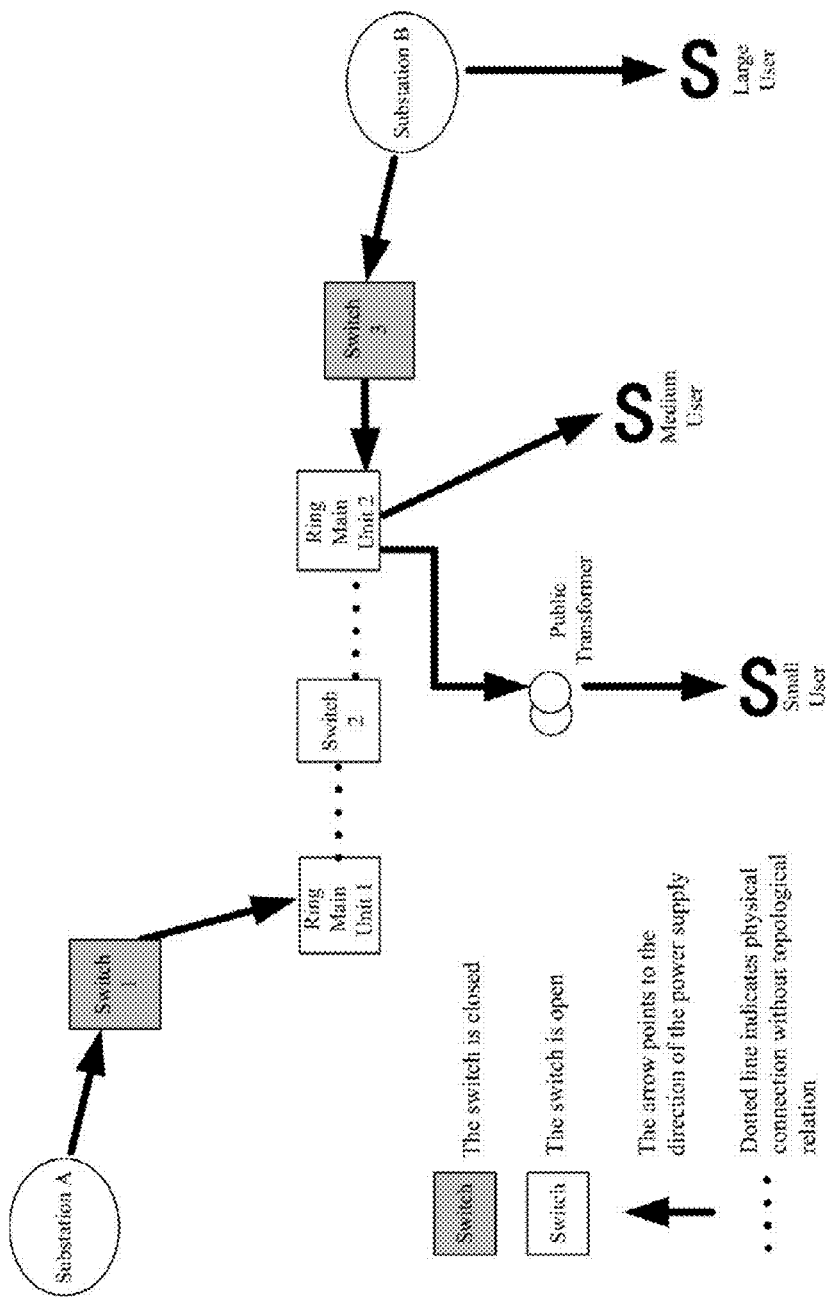
FIG. 13 is a schematic diagram of a topological connection of a network in a normal operation mode.

3) The spatial positions of lines, devices and users in the power grid are closely related to the electronic map; the physical connection between network nodes is closely related to the established connection rule; the topological connection relationship between network nodes is closely related to the connecting state of the switches; the line connection between the nodes is only used for spatial connection, and has no direct impact on the topological relation between the nodes (FIG. 13: a schematic diagram of a topological connection of a network in a normal operation mode). In FIG. 13, in the normal operation mode of the power grid, switches 1 and 3 are closed, and switch 2 is open. The dotted lines on both sides of switch 2 only indicate that switch 2 and ring main units 1 and 2 are only physically connected without topological relation, and the lines represented by the dotted lines have no electricity. The upper-level nodes of ring main units 1 and 2 come from switches 1 and 3, respectively, and their power supplies come from substation A and substation B, respectively.

Figure 14:
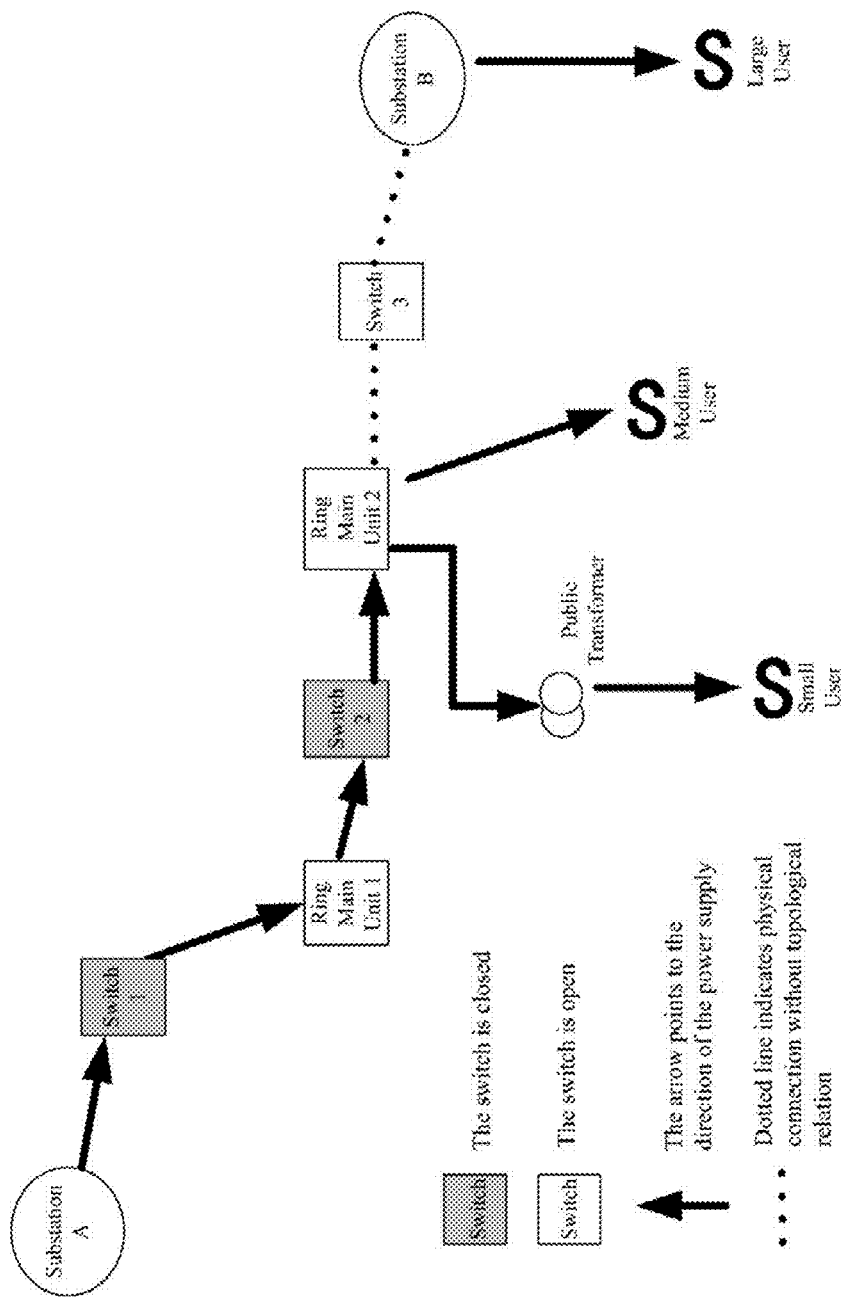
FIG. 14 is a schematic diagram of a topological connection of the network after a change in the operation mode.

4) The change of the connecting state of the switches in the network will determine the operating state of the entire network and directly affect the topological connection relationship between each node in the network. That is, the change of the connecting state of the switches will affect the power supply range of the substation on the power supply side, and directly affect the direction of power supply of related targets, resulting in a change in the topological relation of the upper and lower target nodes (FIG. 14: a schematic diagram of a topological connection of the network after a change in operation mode). In FIG. 14, the operation mode of the power grid is changed. Switches 1 and 2 are closed, and switch 3 is open, and the power supply ranges of substations A and B are changed. The upper-level node of the ring main unit 2 is changed from switch 3 to switch 2, and its power supply is changed from substation B to substation A. Changes occurred in the operating state of the entire network as well as in the topological relation between ring main unit 2 and its upper-level node.

(II) Application for a Power Outage Management System for Users

Figure 15:
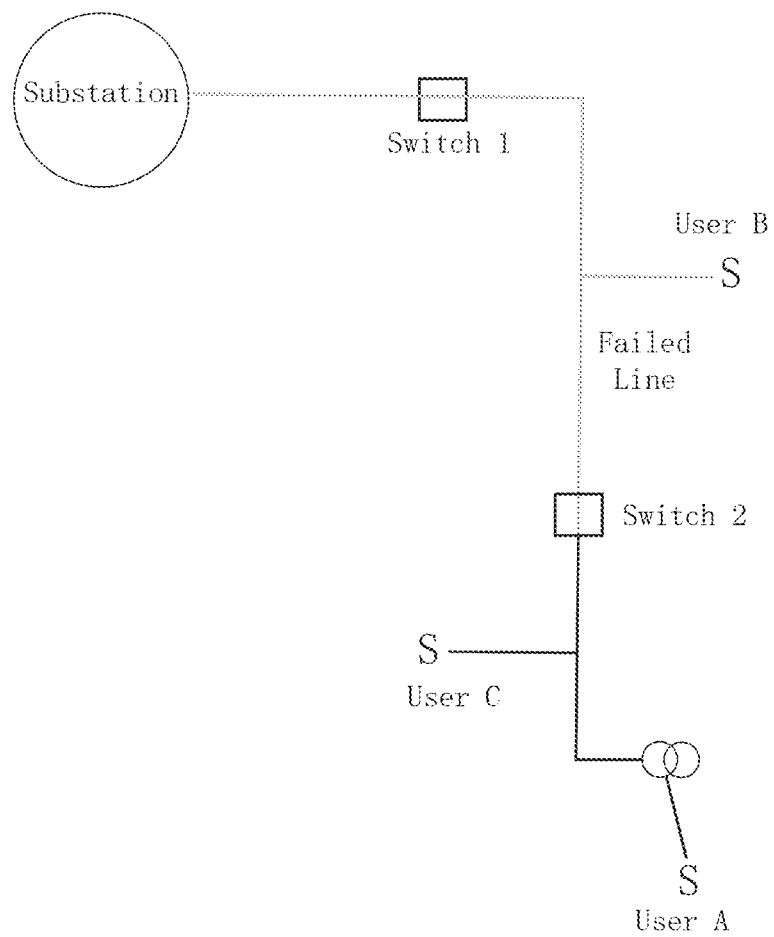
FIG. 15 is a schematic diagram of a user inquiry during a power outage.
Figure 16:
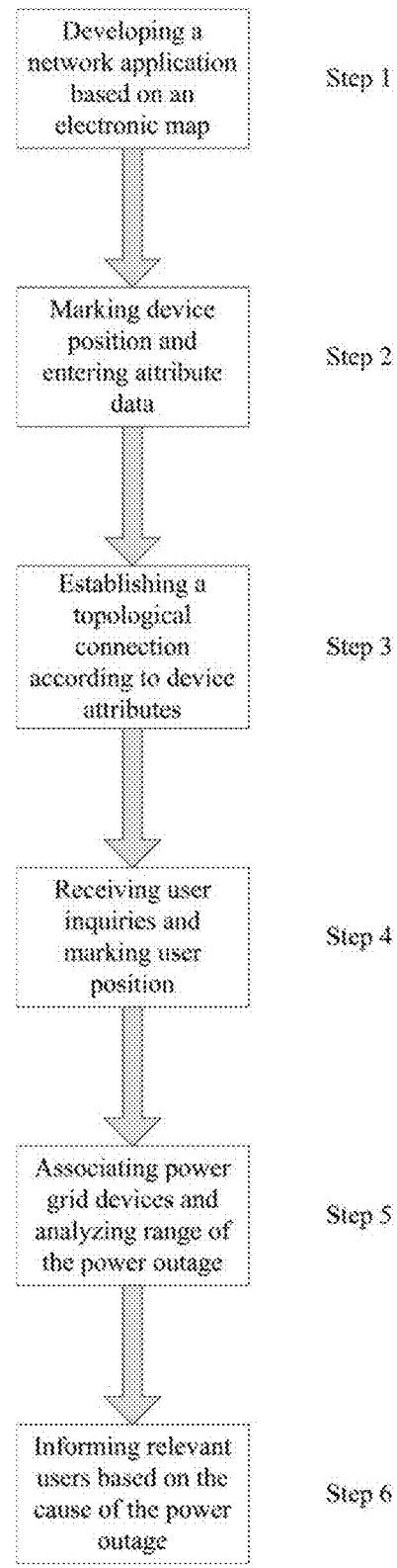
FIG. 16 is a schematic diagram of a power outage handling system for users.

Demand on the power supply has been raised with the improvement in people's living standards. Finding out the outage range and informing relevant users in time by quickly positioning may undoubtedly show high-quality services (FIG. 15: a schematic diagram of outage inquiries from users). The application in the present disclosure may greatly improve the efficiency of information determination and notification of a power outage, which is advantageous to the improvement of service. The relevant steps are as follows (FIG. 16: a schematic diagram of a power outage handling system for users).

Step 1:
1. Content: developing a network application based on an electronic map.
2. Specific approach: developing power grid management software based on an application of geographic information system. The software uses a device as a network node in the power grid management system and is a network management application based on an electronic map.

Step 2:
1. Content: marking the position of the device and entering attribute data.
2. Specific approach: when the power grid management software is applied, the geographic position of the device in the grid can be marked directly on the electronic map, and relevant information of the device is inputted.

Step 3:
1. Content: establishing a topological connection according to device attributes.
2. Specific approach: classifying the devices, and connecting the devices on the map with lines according to the attributes and operating states of the devices, and establishing a topological relation.

Step 4:
1. Content: receiving user inquiries and marking user position.
2. Specific approach: receiving inquiries of power outage information from users by telephone or WeChat, etc., and at the same time, displaying position information of users on the electronic map.

Step 5:
1. Content: associating power grid devices and analyzing the range of the outage.
2. Specific approach:
1) Associating the user with the surrounding power grid devices according to the user's position;
2) Carrying out classification and analysis of power outage for the user according to power supply situation of the power grid devices;
3) In FIG. 15, power supply of user A is from a public transformer, power supply of user C is from switch 2, and user B has no power outage information;
4) According to the analysis of the power outage situation of the users, it can be determined that the failed power supply is all the lines supplied by switch 2. Therefore, all blocks involved in the lines related to switch 2 are within the range of this outage.

Step 6:
1. Content: combining the causes of the power outage and informing relevant users.
2. Specific approach: according to the analysis results, the range of the power outage can be quickly determined, and related users including A and C can be informed immediately in accordance with the maintenance plan or fault repairing situation, so that a quickly response to the power outage area may be achieved.

What is claimed is:

1. A modeling analysis method based on geographic targets, comprising:
step 1: defining a topological connection rule of different types of nodes in a network model in advance according to different attributes and operating states of devices;
step 2: developing a target network software based on an electronic map application, comprising, based on a rule-driven device management modeling method, developing a network software which uses the electronic map as background and is based on cloud storage and cloud computing to prepare for application of a network management model;
step 3: using predetermined targets related to geographic positions as nodes of the network model, and acquiring position information of the nodes along a line by means of a mobile client with wireless positioning and acquisition function and carrying out classification;
step 4: receiving information of target nodes based on the background of the electronic map, comprising receiving the information of the target nodes from the mobile client in the cloud and using the electronic map as the background to display the information of the nodes on the electronic map in the cloud;
step 5: searching for surrounding network nodes based on the position information of the nodes, comprising, on the electronic map, taking the geographic position of a present node as a center and searching for the information of the nodes of an adjacent network around the target according to a predetermined connection rule;
step 6: connecting the nodes representing the geographic positions according to the predetermined rule based on classification results of the nodes displayed on the electronic map, with the electronic map as the background, and automatically achieving connections between the present node and adjacent nodes in the network to establish the modeling analysis method based on geographic targets, so as to analyze topological relation between each node in the network model according to operating states of the each node in the network model.

2. The modeling analysis method based on geographic targets according to claim 1, wherein
the network model includes a simulation network software that simulates network operation rules and performs topological analysis.

3. The modeling analysis method based on geographic targets according to claim 1, wherein
the position information of the nodes is acquired via the mobile client, the mobile client includes GPS devices, mobile phones, Apple touch, street view shooting vehicles, and mobile devices with wireless positioning and acquisition function, wherein positioning methods include: mobile base station positioning, Wi-Fi positioning and GPS positioning.

4. The modeling analysis method based on geographic targets according to claim 1, wherein the position information of the nodes is acquired via the mobile client, the position information of the devices is acquired by the mobile client with an instant messaging service.

5. The modeling analysis method based on geographic targets according to claim 1, wherein
in a software model, by analyzing types of the nodes and existing connection rule, physical connections between the nodes are automatically completed, and topological relation between the nodes is automatically established.

6. The modeling analysis method based on geographic targets according to claim 2, wherein
the position information of the nodes is acquired via the mobile client, the position information of the devices is acquired through the mobile client with a function such as WeChat, facebook, and MSN.

\* \* \* \* \*